United States Patent [19]

Puhk

[11] 3,767,547

[45] Oct. 23, 1973

[54] PHOTOPOLYMERIZATION USING TRIORGANO-SUBSTITUTED PHOSPHINE AND SULFONYL HALIDES AS A PHOTOINITIATOR

[75] Inventor: Heino Puhk, Olmsted, Ohio

[73] Assignee: SCM Corporation, Cleveland, Ohio

[22] Filed: Oct. 21, 1971

[21] Appl. No.: 191,351

[52] U.S. Cl...... 204/159.23, 96/115 P, 204/159.15, 260/88.3, 260/89.3, 260/89.5 R, 260/865
[51] Int. Cl........... C08f 1/20, C08f 3/64, C08f 3/66
[58] Field of Search................. 204/159.15, 159.23, 204/159.24; 96/115 P

[56] References Cited
UNITED STATES PATENTS
3,547,633  12/1970  Rust............................... 204/159.24
3,531,282  9/1970   Miller et al. .................... 204/159.24
3,579,095  12/1951  Sachs et al...................... 204/159.24
3,331,761  7/1967   Mao............................... 204/159.23

Primary Examiner—Wilbert J. Briggs, Sr.
Attorney—M. H. Douthitt

[57]  ABSTRACT

An improved process for polymerizing a vinyl monomer in the presence of a photoinitiator by irradiating the vinyl monomer with a beam of wave energy is set forth. The improvement comprises using an effective amount of a triorgano-substituted phosphine and a sulfonyl halide in combination as the photosensitizer.

7 Claims, No Drawings

PHOTOPOLYMERIZATION USING TRIORGANO-SUBSTITUTED PHOSPHINE AND SULFONYL HALIDES AS A PHOTOINITIATOR

The polymerization of vinyl monomers by subjecting them to irradiation with ultraviolet light is well known. The advantages of using a polymerization process of this type is that no heat is required to effect polymerization. Additionally, polymerization times are relatively short; e.g., less than 1 hour, and thus suited for a process for preparing coated substrates.

There has been considerable effort expended in finding photoinitiator systems which will reduce the polymerization times of vinyl monomers when polymerized by irradiating with ultraviolet light and to find systems which will not discolor the resultant film or adversely affect properties thereof, etc.

U.S. Pat. No. 3,331,761 shows that it is known to use tri-organo phosphines, such as triphenyl phosphine as a photopolymerization catalyst for the polymerization of lower alkyl esters of acrylic and methacrylic acid. Polymerization times of less than one hour have been noted where strong intensity lights are used where the distance from the monomer sample to the light is from about 1 to 2 inches, and the samples are held in Vycor or quartz containers.

Triorgano phosphines, e.g., triphenyl phosphine, have also been combined with sulfinic acid and organo-derivatives thereof, e.g., $\alpha$-toluene sulfinic acid, but particularly, the halides such as benzene sulfinic chloride, ethane sulfinyl chloride, and so forth as a photosensitizer for the photopolymerization of monomer systems. See Rust's U.S. Pat. Nos. 3,547,433 and 3,531,281.

U.S. Pat. No. 2,579,095 shows a process for the polymerization of arcylic monomers, i.e., the esters of acrylic or methacrylic aicd, e.g., methylmethacrylate and so forth, by using a halosulfonyl compound as the photopolymerization catalyst. Examples of the halosulfonyl compositions are the organosulfonyl compounds such as methane sulfonyl chloride, ethane sulfonyl chloride, benzene and para-toluene sulfonyl chloride, and so forth.

A particular combination of photoinitiator materials have been found to act in a synergistic manner for effecting rapid polymerization of activated vinyl monomers, i.e., those capable of being polymerized by irradiation with a beam of wave energy. The synergistic catalyst useful for the photopolymerization of such activated vinyl monomers is a combination comprising a tri-organo-substituted phosphine and a halosulfonyl compound in a ratio of from about 0.25 moles phosphine to 0.75 moles halosulfonyl compound to 0.75 moles phosphine to 0.25 moles halosulfonyl compound. The synergistic catalyst is incorporated in the vinyl monomer in an effective amount typically in a proportion of from about 0.0025 to 0.01 moles per mole of vinyl monomer present.

Advantages of the photosensitive catalyst set forth as the invention is that polymerization of activated vinyl monomers can be accomplished with the monomer at a considerable distance from the wave energy beam source. For example, where ultraviolet light is used as the wave energy source distances of 7 to 10 inches from the source are common, while achieving rapid polymerization. Another advantage is that the samples can be cured rapidly in soft glass vials, whereas quartz or Vycor glass vials are generally used for the polymerization with other catalyst systems. Another advantage in using the photosensitive catalyst is that there is practically no discoloration of the polymer system.

In practicing the invention, the activated vinyl monomers are irradiated with a beam of wave energy, the energy provided in the beam being used to initiate free radicals for effecting polymerization. Generally, the wave energy is supplied by an ultraviolet lamp with the wave length of the ultraviolet beam being from about 1,800 to 4,000 Angstroms. Other types of energy differ in the wave length of the energy beam used; for example, it can be photopolymerization by using black light which has a much shorter wave length, and is not visible to the naked eye. For efficiency and economy, ultraviolet light is used as the source of energy for photopolymerization.

Vinyl monomers capable of undergoing polymerization by irradiation with ultraviolet light in the presence of a photoinitiator are known. These vinyl monomers, of course, have the vinyl group ($CH_2$=CH—) as a characteristic linkage, but additionally, these vinyl monomers have the vinyl group activated by another group, e.g., an unsaturated group, as in styrene, vinyl toluene, butadiene, etc., a halogen group such as chlorine, as in vinyl chloride, a carbonyl group (C=O), as in acrylamide, methylvinyl ketone, vinyl acetate, a nitrile group (C≡N), as in acrylonitrile, and so forth. Particularly adaptable to polymerization by irradiation with ultraviolet light are the lower alkyl esters of acrylic and methacrylic acid, the lower alkyl portion having from about one to six carbon atoms. Examples of such acrylic and methacrylic esters which can be used in practicing the invention are methylmethacrylate, 2-ethylhexylacrylate, butylacrylate, arylmethacrylate, metharylmethacrylate, dimethacrylates, such as ethylene glycol dimethacrylate, hexylethylene glycol dimethacrylate, and alkoxy methacrylates, such as glycidyl methacrylate, and so forth. Additionally, hydroxy alkyl acrylates, such as hydroxy propyl methacrylate, hydroxy ethyl methacrylate, and so forth are amenable to the polymerization process.

Also to be included in the term "vinyl monomer" are the unsaturated polyesters crosslinkable with styrene and the lower alkyl esters of acrylic and methacrylic acid. Such polyesters are known in the art and derived from the reaction of an $\alpha,\beta$-unsaturated dicarboxylic acid, e.g., maleic, fumaric, itaconic, citraconic acid or anhydride and a polyhydric alcohol, e.g., glycerin pentaerythritol, etc.

The halosulfonyl compounds useful in the present process are the organosulfonyl halides represented by the general formula:

$$R - SO_2 - X$$

wherein R represents a monovalent organic radical preferably; a lower alkyl radical such as a methyl, ethyl, propyl, & butyl group, an aryl radical; e.g., benzene, naphthalene, and substituted aryl groups such as the nitro- and halo- substituted aryl groups, e.g., nitrobenzene, bromobenzene, toluene, acetamido benzene, iodobenzene, and so forth; and X represents a halogen atom preferably chlorine. Specific examples of sulfonyl halides which can be used as one component in the catalyst system are 1,3-benzene disulfonylchloride, 2,4-dinitrobenzene sulfonyl chloride, $\beta$-naphthalene sulfonyl chloride, ethane sulfonyl chloride, benzene sulfonyl bromide, benzene sulfonyl chloride, methane sulfonyl chloride, paratoluene sulfonyl chloride, paraacetamido benzene sulfonyl chloride, para-iodobenzene sulfonyl chloride, paranitrobenzene sulfonyl chloride, parabromobenzene sulfonyl chloride, metanitrobenzene sulfonyl chloride, and so forth.

The triorgano phosphines are aliphatic and aromatic derivatives of phosphine. They are represented by the formula:

where R, R', and R'' are like or unlike organo groups selected from the group consisting of alkyl groups having from one to five carbon atoms and aromatic groups; e.g., benzene, Examples of aromatic phosphines include triphenyl phosphine, methyl diphenyl phosphine, dibutyl phenyl phosphine, and so forth. Alkyl phosphines include trimethyl phosphine, triethyl phosphine, tripropyl phosphine, tributyl phosphine, and so forth. In a preferred embodiment of the invention, the triorgano-substituted phosphine is triphenyl phosphine.

The light-sensitive halosulfonyl compound and triorgano phosphines are formulated together in a molar ratio of from about 0.25 to 0.75 moles to 0.75 to 0.25 moles triorgano phosphine to sulfonyl halide compound. Preferably, each component is used on about an equal molar basis. Infrared spectroscopy indicates that the product obtained on combination of the components produces a complex or linkage not seen in the spectrograph of the individual components. The spectrograph of the combination shows a peak having a wave number of 1,110. The wave number, however, is commonly expressed as the reciprocal of the wave length in centimeters. Thus the peak is expressed as 1,110 cm $^{-1}$.

When the ratio of sulfonyl halide to triorgano phosphine falls below about 0.25 moles per 0.75 moles organo phosphine, the polymerization rate of the vinyl monomer often decreases and the advantageous results normally attained with the combination are not achieved. When the ratio of triorgano phosphine to sulfonyl halide exceeds about 0.75 moles per 0.25 moles sulfonyl halide, the polymerization rate tends to fall off showing that the synergistic properties are not attained. Thus, greater light intensity often is required to achieve the same rate of polymerization. Greater light intensities being obtainable by employing a stronger light or bringing the sample closer to the light; e.g., from a distance of 7 inches to 1 inch.

The photosensitive catalyst, i.e., the combination of halo-sulfonyl compound and triorgano phosphine can be incorporated into the vinyl monomers by simply adding to the vinyl monomer or the syrup to be polymerized. The sulfonyl halide and phosphine components are soluble in the activated vinyl monomer systems, or syrups and blend in with very little mixing. An effective amount of photosensitive catalyst is used to establish photosensitivity of the monomer system. Typically, an effective amount is expressed in terms of equivalents (moles) per mole of vinyl monomer to be polymerized. Both the triorgano phosphine and the halosulfonyl compound and vinyl monomers having only one unsaturated site have a functionality of 1 per mole. Dienes; i.e., butadiene have a functionality of 2 per mole. Typically, an effective amount is from about 0.0025 to 0.01 and preferably, 0.0035 to 0.0055 moles catalyst per mole of vinyl monomer having a functionality of 1 per mole. When the ratio falls below about 0.0025 moles per mole of monomer, the polymerization rate often decreases to an almost unacceptable level. Though significant advantages at this time have been noted when the ratio of photosensitive catalyst to vinyl monomer is above about 0.01 moles per mole of monomer system, preferably as stated, the ratio is from about 0.0035 to 0.0055 moles per mole of vinyl monomer.

The following examples are provided to illustrate preferred embodiments of the invention and are not intended to restrict the scope thereof.

EXAMPLE I

Twenty-four photosensitive solutions were individually prepared by mixing the photosensitive catalyst of triphenyl phosphine or toluene sulfonyl chloride or both, with 19.4 grams of hydroxy propyl acrylate (HPA) monomer. Each photosensitive solution then is mixed with a solvent in a proportion of 1 percent by weight, and added to a soft glass vial and capped. Polymerization of the monomer solution is carried out by placing the vial approximately 7 inches from an ultraviolet lamp No. H14T3 manufactured by General Electric having a wattage of approximately 255 watts; 28 watts in the far UV spectrum, 68 watts in the middle UV section; 52 watts in the near UV section, and 107 watts in the visible section.

Table I below shows the results of samples irradiated with ultraviolet light, wherein the molar concentration of triphenyl phosphine is varied from 0 to 0.0014 moles per 19.4 grams HPA and 0 to 0.0014 moles sulfonyl chloride per 19.4 grams HPA. The samples were irradiated with ultraviolet light in cycles, the first two cycles being 2 minutes each, the third 5 minutes, the fourth 10 minutes, the fifth 10 minutes, the sixth 20 minutes, and the seventh 20 minutes, respectively as is indicated in the table.

The results show that samples 13 through 16 polymerized to about 100 percent completion in a period of 9 to 19 minutes, whereas the other samples not containing the combination of triphenyl phosphine and toluene sulfonyl chloride did not polymerize to any great degree even when a proportionate amount of catalyst is used. Thus, it is concluded in that the combination of triphenyl phosphine and toluene sulfonyl chloride initiates polymerization at a faster rate than both used individually, and therefore acts synergistically.

EXAMPLE II

Twenty-one hydroxy propyl acrylate samples of 19.4 grams each were photosensitized in exactly the same manner as Example I, except for variation of the catalyst and level, and then irradiated with ultraviolet light supplied by the lamp described in Example I. Table II shows the effectiveness of several halosulfonyl compounds in combination with triphenyl phosphine, those being toluene sulfonyl chloride, methane sulfonyl chloride, and benzene sulfonyl chloride, hereinafter referred to as "TSC", "MSC", and "BSC", respectively.

TABLE I.—TPP/TSC CATALYZED UV. POLYMERIZATION OF HPA

| Run | Triphenyl phosphine (TPP) Moles | Triphenyl phosphine (TPP) Percent by weight | Toluene sulfonyl chloride (TSC) Moles | Toluene sulfonyl chloride (TSC) Percent by weight | Solvent, 1% by wt. monomer | Percent polymerization, UV. cycles, minutes 2 min. | 2 min. | 5 min. | 10 min. | 10 min. | 20 min. | 20 min. |
|---|---|---|---|---|---|---|---|---|---|---|---|---|
| 1 | None | None | None | None | None | | | | | | | X |
| 2 | None | None | None | None | Benzene (B) | | | | | | | X |
| 3 | None | None | None | None | Methanol (M) | | | | | | | X |
| 4 | None | None | None | None | Tetrahydrofuran (THF) | | | | | | | X |
| 5 | None | None | 0.0007 | .69 | None | | | | | | | X |
| 6 | None | None | 0.0007 | .69 | B | | | | | | | X |
| 7 | None | None | 0.0007 | .69 | M | | | | | | | X |
| 8 | None | None | 0.0007 | .69 | THF | | | | | | | X |
| 9 | 0.0007 | .94 | None | None | None | | | | | | | X |
| 10 | 0.0007 | .94 | None | None | B | | | | | | | X |
| 11 | 0.0007 | .94 | None | None | M | | | | | | | X |
| 12 | 0.0007 | .94 | None | None | THF | | | | | | | X |
| 13 | 0.0007 | .94 | 0.0007 | .69 | None | | | | 100 | | | |
| 14 | 0.0007 | .94 | 0.0007 | .69 | B | | | 100 | | | | |
| 15 | 0.0007 | .94 | 0.0007 | .69 | M | | | | 100 | | | |
| 16 | 0.0007 | .94 | 0.0007 | .69 | THF | | | | 100 | | | |
| 17 | None | None | 0.0014 | 1.38 | None | | | | | | | X |
| 18 | None | None | 0.0014 | 1.38 | B | | | | | | | X |
| 19 | None | None | 0.0014 | 1.38 | M | | | | | | | X |
| 20 | None | None | 0.0014 | 1.38 | THF | | | | | | | X |
| 21 | 0.0014 | 1.88 | None | None | None | | | | | | | X |
| 22 | 0.0014 | 1.88 | None | None | B | | | | | | | X |
| 23 | 0.0014 | 1.88 | None | None | M | | | | | | | X |
| 24 | 0.0014 | 1.88 | None | None | THF | | | | | | | X |

NOTE.—"X" in the above table indicates that the monomer did not polymerize after such irradiation treatments.

TABLE II

| Run | TPP, moles | Sulfonyl chloride, moles | moles | Cycles in minutes 10/1 | 15/2 | 10/3 | 20/4 | 20/5 | 20/6 | 20/7 | 20/8 | 30/9 | 30/10 | 60/11 | 60/12 | 13 | 14 | 15 | 16 |
|---|---|---|---|---|---|---|---|---|---|---|---|---|---|---|---|---|---|---|---|
| 1 | 0 | None | None | X | X | X | X | X | X | X | X | X | X | X | | | | | |
| 2 | 0 | TSC | 0.0007 | X | X | X | X | X | X | X | X | X | X | X | X | | | | |
| 3 | 0 | MSC | 0.0007 | X | X | X | X | X | X | X | X | X | X | X | X | | | | |
| 4 | 0 | BSC | 0.0007 | X | X | X | X | X | X | X | X | X | X | X | X | | | | |
| 5 | 0 | TSC | 0.0014 | X | X | X | X | X | X | X | X | X | X | 5 | | | | | |
| 7 | 0 | MSC | 0.0014 | X | X | X | X | X | X | X | X | X | X | X | 40 | | | | |
| 8 | 0 | BSC | 0.0014 | X | X | X | X | X | X | X | X | X | X | X | X | | | | |
| 10 | 0.0007 | None | None | X | X | X | X | X | X | X | X | X | 1% | 15 | 55 | | | | |
| 11 | 0.0007 | TSC | 0.0007 | 80 | 100 | | | | | | | | | | | | | | |
| 12 | 0.0007 | MSC | 0.0007 | 40 | 40 | 40 | 40 | 50 | 75 | 90 | 95 | 100 | | | | | | | |
| *13 | 0.0007 | BSC | 0.0007 | 10 | 100 | | | | | | | | | | | | | | |
| 15 | 0.0014 | None | None | X | X | X | X | X | X | X | X | X | X | 3% | | | | | |
| *16 | 0.0014 | TSC | 0.0014 | 100 | | | | | | | | | | | | | | | |
| *17 | 0.0014 | MSC | 0.0014 | | | | 95 | 95 | 95 | 100 | | | | | | | | | |
| 18 | 0.0014 | BSC | 0.0007 | 95 | 100 | | | | | | | | | | | | | | |
| 20 | 0.0028 | None | None | X | X | X | X | X | X | X | X | X | 5% | 20 | 50 | | | | |
| 21 | 0.0028 | do | None | X | X | X | X | X | X | X | X | X | X | X | | | | | |

The above results show that samples using a synergistic photosensitive initiator of triphenyl phosphine and a sulfonyl chloride in a proportion of 0.0007 gram moles and 0.0014 gram moles per 19.4 grams HPA effected polymerization of the hydroxy propyl acrylate monomer, whereas samples containing no triphenyl phosphine or sulfonyl chloride did not induce such polymerization, even at higher levels of triphenyl phosphine or sulfonyl halide.

EXAMPLE III

A sample of 19.4 grams hydroxy propyl acrylate is mixed with 0.0007 moles benzene sulfonyl chloride and 0.0007 moles tributyl phosphine. The resultant sample is irradiated with ultraviolet light from the lamp described in Example I for 15 minutes, the distance from the lamp being about 7 inches. At the end of the 15-minute period, the sample was fully cured.

What is claimed is:

1. In a process for photopolymerizing a vinyl monomer selected from the group consisting of lower alkyl esters of acrylic and methacrylic acids, and crosslinkable unsaturated polyesters in the presence of a photoinitiator by irradiating said monomer with a a beam of ultraviolet radiation of about 1,800 to 4,000 Angstroms in wavelength, the improvement which comprises incorporating into said monomer a synergistic sensitizer consisting essentially of a tri-organo-substituted phosphine and an arylsulfonyl chloride, said synergistic sensitizer being incorporated in a proportation of from about 0.0025 to 0.01 mole per one mole of monomer.

2. The process of claim 1 wherein the molar ratio of tri-organo-substituted phosphine to arylsulfonyl chloride is from about 0.25:0.75 to 0.75:0.25.

3. The process of claim 1, wherein said triorganophosphine is triphenyl phosphine.

4. The process of claim 1, wherein said lower alkyl ester is a hydroxy alkyl ester of acrylic or methacrylic acid.

5. The process of claim 1, wherein said aryl sulfonyl chloride is benzene sulfonyl chloride.

6. The process of claim 1, wherein said aryl sulfonyl chloride is para-toluene sulfonyl chloride.

7. The process of claim 1, wherein said aryl sulfonyl chloride is 2-naphthylsulfonyl chloride.

* * * * *